United States Patent Office 2,898,485
Patented Aug. 4, 1959

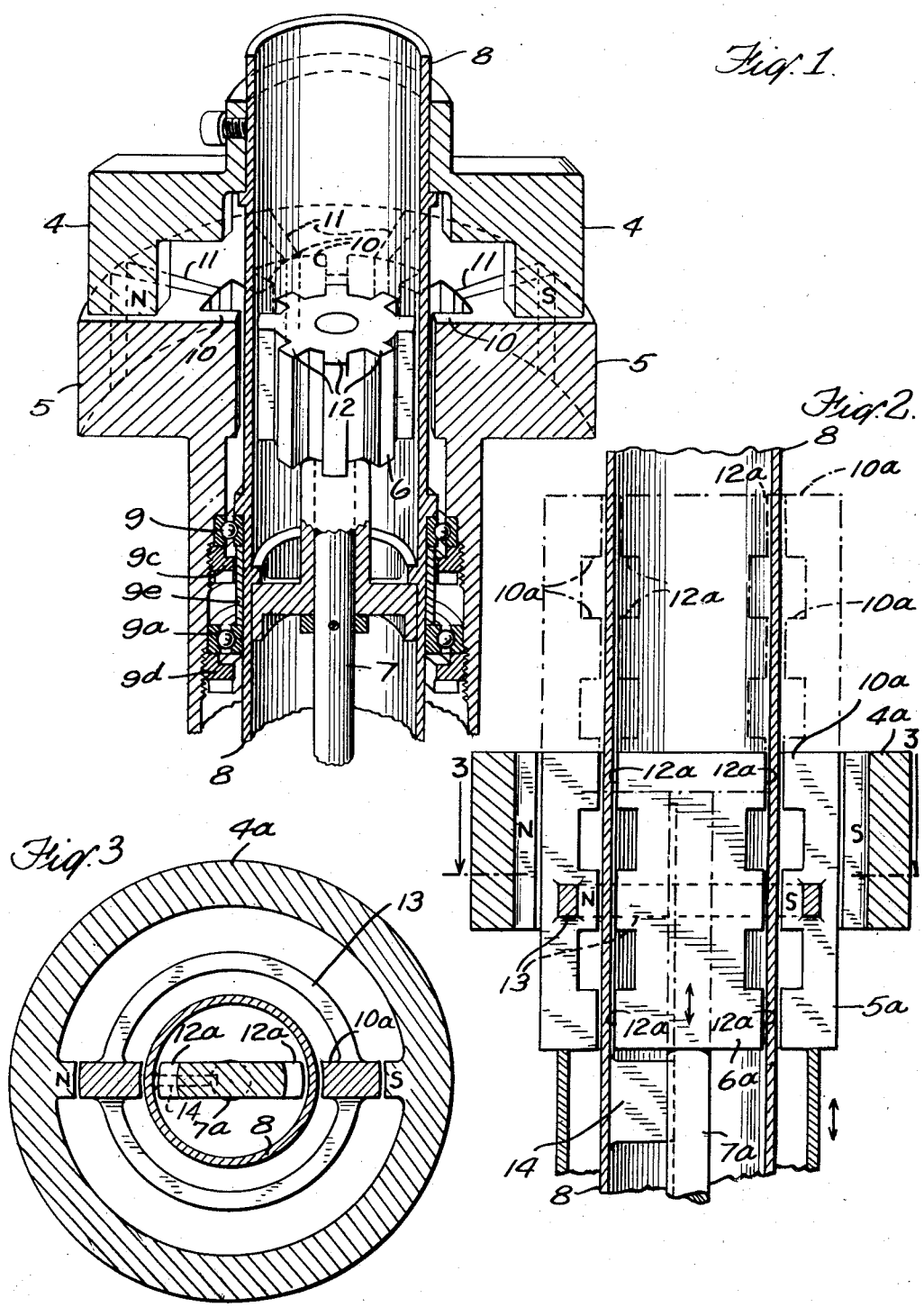

2,898,485

MAGNETIC CLUTCH

Albert Richter, Lynbrook, and Vincent Ordorica, Brooklyn, N.Y., and Donald Gertz, Oak Ridge, Tenn., assignors to Sperry Rand Corporation, Ford Instrument Company Division, Long Island City, N.Y., a corporation of Delaware Application September 17, 1957, Serial No. 684,490

9 Claims. (Cl. 310—104)

This invention relates to a magnetic clutch and particularly to a system for transmitting motion from one member to another member in a magnetic flux field.

Heretofore motion transmitting systems have depended on the employment of linear or rotating synchronous motors wherein the motion is transmitted from a stator to the controlled rotor element by the magnetic field as a function of supply frequency. In most control applications, the required speeds of motion are too slow to permit control with motors of conventional design operating from normally available supply frequencies. Various expedients have been adopted to overcome the limitations of the synchronous motor control such as the provision of speed reducing gear trains and low frequency power suppliers.

According to this invention, a motor of conventional design may be employed to impart linear or rotary motion to a member fabricated of magnetic material which transmits the motion to a second member of like character by means of magnetic field produced by a stationary magnetic member. Brushes, slip rings or other components subject to wear are not required and the system is adapted to be driven by conventional power sources. The system is particularly adapted to transmit motion through a metallic non-magnetic wall interposed as between the two members although other applications are anticipated.

One object of the invention is to provide a magnetic clutch of single and durable design.

Another object is to provide a magnetic clutch operative in a field produced by a stationary magnet which is thus independent of the supply frequency.

Another object of the invention is to provide an improved magnetic clutch capable of transmitting and responding to rotary motion.

A further object of the invention is to provide an improved linear motion type of magnetic clutch.

Other objects and advantages of the invention may be appreciated from the following specification in conjunction with the accompanying drawings, in which Fig. 1 is a perspective in partial section showing a rotary type magnetic clutch.

Fig. 2 is a vertical section taken on line 2—2 of Fig. 3 showing linear motion type of magnetic clutch; and Fig. 3 is a section in plan of the clutch shown in Fig. 2.

As shown in Fig. 1, the magnetic clutch includes a stationary magnet 4, an outer rotary member 5 rotatable in flux linking adjacency to the north and south poles of the stationary magnet and an inner rotary member 6 mounted on a shaft 7 and concentrically disposed within the outer member. A non-magnetic wall 8 is interposed between the members. The stationary magnet is bolted to the wall 8 and may be of the permanent (as shown) or electro-magnetic type. Bearings 9 and 9a are supported between the member 5 and the wall 8 by means of rings 9c and 9d threadably secured to the member 5 and a brace 9e fitted about the wall between the bearings.

The rotary members are made of a magnetic material of minimal magnetic retention such as soft iron. The outer rotary member 5 has circumferentially mounted on its inner face a series of inwardly projecting elements 10 which are established by the field as salient poles. The poles are magnetically insulated by non-magnetic sections 11 which are interposed between the poles so as to preclude a flux path in the outer member. The inner rotary member 6 is provided with corresponding pole pieces 12 which are similarly established by the field as salient poles of opposing polarity with respect to the corresponding poles on the outer member. The polarized members thereby present a flux path of minimum reluctance to the magnetic lines of force. Because the lines of force seek the least reluctance path across the poles of the magnet, they tend to align the salient poles of the inner and outer members. It is apparent, therefore, that if the outer member is rotated at the desired speed as by a motor (not shown) an alignment torque, which is proportional to the square of the flux density, will be produced which will tend to rotate the inner member in synchronism.

The magnetic clutch shown in Figs. 2 and 3 is arranged for linear motion transmission and response. The outer and inner members 5a and 6a, respectively, are concentrically disposed between the poles of an uninsulated, stationary magnet 4a. The salient poles 10a of the outer member 5 are supported by connecting rings 13 and the salient poles 12a of the inner member are axially aligned with respect to the direction of imparted motion. The tendency of the corresponding salient poles of the two members to maintain their opposing positions so as to minimize the reluctance presented to the magnetic lines of force between the poles of the magnet is present in this form of clutch whose structure is slightly modified for linear motion operation. The outer member may be caused to move in linear translation as by a lead screw or rack (not shown). An inwardly projecting key 14 on the wall 8 engaging a keyway in the shaft of the inner member 6a precludes rotation of the inner member on its actuation.

It must be understood that various other applications and embodiments of the principle of invention may be effected by persons skilled in the art without departing from the scope of the invention as defined in the appended claims.

What is claimed is:

1. A motion transmitting mechanism comprising an elongated non-magnetic tubular wall defining a container, a control element mounted in said container for longitudinal movement therein, a magnet mounted in fixed spaced relation to said container concentric with the outer surface thereof, a first magnetizable element secured to said control element within said container for movement in unison therewith, means preventing rotation of said control element and said first magnetizable element during longitudinal movement thereof, a second magnetizable element disposed between said magnet and the outer surface of said tubular wall for longitudinal movement with respect thereto, said magnet being provided with diametrically opposed positive and negative pole pieces projecting radially inwardly from an annulus, said first magnetizable element being provided with diametrically opposed positive and negative pole pieces, and said second magnetizable element comprising diametrically opposed pole pieces connected together by a ring member, the said pole pieces of said first magnetizable element and the pole pieces of said second magnetizable element being adapted to be magnetized by said magnet and when magnetized to radially align whereby longitudinal movement of one of said magnetizable elements will be imparted to the other of said magnetizable elements.

2. A motion transmitting mechanism as defined in claim 1 in which said magnet comprises a permanent magnet having a single pair of diametrically opposed positive and negative pole pieces.

3. A motion transmitting mechanism comprising an elongated non-magnetic tubular wall defining a container, a control element mounted in said container for longitudinal movement therein, a magnet mounted in fixed position with respect to said container, a first magnetizable element secured to said control element within said container for movement in unison therewith, a second magnetizable element disposed outwardly of said container for longitudinal movement with respect thereto; said magnet, said first magnetizable element and said second magnetizable element being each provided with positive and negative pole pieces; the said pole pieces of said first magnetizable element and the said pole pieces of said second magnetizable element being adapted to be magnetized by said magnet and when magnetized to radially align whereby longitudinal movement of one of said magnetizable elements will be imparted to the other of said magnetizable elements.

4. A motion transmitting mechanism as defined by claim 3 in which said magnet comprises a permanent magnet having a single pair of diametrically opposed positive and negative pole pieces.

5. A motion transmitting mechanism as defined by claim 4 in which said first magnetizable element comprises a single pair of diametrically opposed positive and negative pole pieces.

6. A motion transmitting mechanism as defined by claim 5 in which said second magnetizable element comprises a single pair of diametrically opposed positive and negative pole pieces.

7. A motion transmitting mechanism as defined by claim 3 in which said first magnetizable element comprises a single pair of diametrically opposed positive and negative pole pieces.

8. A motion transmitting mechanism as defined by claim 7 in which said second magnetizable element comprises a single pair of diametrically opposed positive and negative pole pieces.

9. A motion transmitting mechanism as defined by claim 3 in which said second magnetizable element comprises a single pair of diametrically opposed positive and negative pole pieces.

References Cited in the file of this patent

UNITED STATES PATENTS

| | | |
|---|---|---|
| 700,839 | Sessions | May 27, 1902 |
| 1,298,966 | Knowlson | Apr. 1, 1919 |
| 1,568,305 | Williams | Jan. 5, 1926 |
| 1,724,272 | Ford | Aug. 13, 1929 |
| 2,636,139 | Winget | Apr. 21, 1953 |

FOREIGN PATENTS

| | | |
|---|---|---|
| 65,594 | Switzerland | May 26, 1913 |
| 1,008,834 | France | Feb. 27, 1952 |